United States Patent
Allansson et al.

(10) Patent No.: US 6,427,436 B1
(45) Date of Patent: *Aug. 6, 2002

(54) EMISSIONS CONTROL

(75) Inventors: Ronny Allansson, Kingsbacka; Klas Anders Andreasson, Frolunda; Nils Myers, Lerum; Ari Uusimaki, Gothenburg, all of (SE); James Patrick Warren, Cambridge (GB)

(73) Assignee: Johnson Matthey Public Limited Company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,663
(22) PCT Filed: Aug. 10, 1998
(86) PCT No.: PCT/GB98/02408
§ 371 (c)(1),
(2), (4) Date: Apr. 28, 2000
(87) PCT Pub. No.: WO99/09307
PCT Pub. Date: Feb. 25, 1999

(30) Foreign Application Priority Data

Aug. 13, 1997 (GB) .............................................. 9717034

(51) Int. Cl.⁷ ............................................... F01N 3/00
(52) U.S. Cl. ................. 60/274; 60/278; 60/280; 60/292; 60/605.2; 60/602; 123/571
(58) Field of Search ................. 60/278, 280, 311, 60/324, 292, 320, 605.02, 602; 123/571

(56) References Cited

U.S. PATENT DOCUMENTS

| | | | | |
|---|---|---|---|---|
| 4,231,338 A | * | 11/1980 | Sugasawa et al. | 123/568 |
| 4,406,126 A | * | 9/1983 | Yokokura et al. | 60/605 |
| 4,534,173 A | * | 8/1985 | Tsukamoto | 60/606 |
| 4,902,487 A | | 2/1990 | Cooper et al. | |
| 5,050,376 A | * | 9/1991 | Stiglic et al. | 60/274 |
| 5,440,880 A | * | 8/1995 | Ceynow et al. | 60/605.2 |
| 5,564,283 A | * | 10/1996 | Yano et al. | 60/274 |
| 5,785,030 A | * | 7/1998 | Paas | 60/278 |
| 5,806,308 A | * | 9/1998 | Khair et al. | 60/278 |
| 6,062,026 A | * | 5/2000 | Woollenweber et al. | 60/605.2 |
| 6,240,721 B1 | * | 6/2001 | Ito et al. | 60/274 |
| 6,301,888 B1 | * | 10/2001 | Gray, Jr. | 60/605.2 |
| 6,338,245 B1 | * | 1/2002 | Shimoda et al. | 60/285 |

FOREIGN PATENT DOCUMENTS

| | | |
|---|---|---|
| JP | 8338320 | 12/1996 |
| JP | 9088727 | 3/1997 |

OTHER PUBLICATIONS

UK Search Report, dated Nov. 5, 1997, for corresponding GB application.

International Search Report, dated Nov. 26, 1998; for corresponding EPO application.

* cited by examiner

Primary Examiner—Thomas Denion
Assistant Examiner—Binh Tran
(74) Attorney, Agent, or Firm—Ratner & Prestia

(57) ABSTRACT

A heavy duty diesel engine having an exhaust system incorporating a catalyst to convert NO to $NO_2$ and a particulate trap on which soot particles are continuously oxidized, and a portion of the exhaust gases are recirculated through a cooler and exhaust gas flow valve before being mixed with air and fed to the engine cylinders. The system also incorporates a sensor to detect the amount of NOx in the exhaust to adjust the gas flow valve, thereby adjusting the portion of recirculated exhaust gas fed to the engine cylinders.

8 Claims, 2 Drawing Sheets

EMISSIONS CONTROL

This application is the U.S. national-phase application of PCT International Application No. PCT/GB98/02408.

BACKGROUND OF THE INVENTION

The present invention concerns improvements in emissions control. More especially, the invention concerns improvements in the control of NOx from diesel engines.

The use of emission control catalysts for engine exhaust clean-up is well established. Diesel engines have different characteristics from gasoline-fuelled engines, with a different mix of pollutants caused by the different fuels, the different combustion characteristics in each engine and the lower temperatures met with in exhausts from diesel engines. Additionally diesel engines emit more noticeable particulates, especially under heavy load and upon start-up, than gasoline engines. In general, it can be said that diesel engines emit less NOx than a gasoline engine under most conditions, but because diesel engines mostly or exclusively operate on a high air to fuel ratio, that is are "lean"-burn engines, the chemistry of the exhaust gas does not favour NOx reduction, because of the excess of oxidising species.

To meet the various emission regulations already or about to enter force, it has become necessary to treat diesel exhausts in various ways. Oxidation catalysts, which catalyse the oxidation of unburnt hydrocarbons ("HCs") and carbon monoxide ("CO") are now regularly fitted to light duty diesels, and particulate traps of various types are becoming commonplace on heavy duty diesels as used in trucks, buses and some stationary engines. A technique for improving exhaust gas emissions, especially NOx emissions from diesel engines is exhaust gas recirculation ("EGR"), which takes a proportion of the exhaust gas and recirculates it into the engine cylinders. Generally, about 30 to 60 vol % of the exhaust gases are recirculated, depending upon the characteristics of the particular engine and the emission limits which must be met. Although EGR has been used with gasoline engines for about ten years, it has only been more recently fitted to diesel engines; we believe that most vehicles currently fitted with EGR are passenger car light duty diesel engines. In the case of engines fitted with a catalyst, the exhaust gas is always taken from upstream of the catalyst. It is generally expected that EGR would have a significant effect on emissions from heavy duty diesel engines, that is those fitted to heavy trucks and buses. Because of the engineering problems caused by the very different exhaust characteristics compared to light duty diesel engines, however, this has proved difficult to achieve. In particular, there is no commercial source of an EGR valve of suitable size and materials to be fitted to a heavy duty diesel engine.

We refer also to a device marketed as the "CRT" by Johnson Matthey PLC. This device is described in U.S. Pat. No. 4,902,487 and is a continuously regenerative particulate trap. Unlike the vast majority of particulate traps, however, this device regenerates in situ without the need for periodic replacement or electrical heating to ignite the soot. Such device relies upon a catalyst system which generates $NO_2$ which we found is effective to cause low temperature combustion of trapped soot particles.

The principle of the CRT has been adopted by Hino in their published Japanese patent applications JP 8338320 and JP 9088727, in combination with EGR. However, such systems as described are not believed to be capable of use in true heavy duty diesel applications.

BRIEF SUMMARY OF THE INVENTION

We have surprisingly found that a novel diesel engine system can offer very low levels of NOx. The present invention provides a diesel engine system comprising a diesel engine and an exhaust system therefor, the exhaust system incorporating a catalyst effective to convert NO to $NO_2$ under normal operating conditions, a trap for particulates mounted downstream of the catalyst and an exhaust gas recirculation valve with cooling means to cool the portion of exhaust gas which is recirculated, characterised in that the cooling means is mounted upstream of the exhaust gas recirculation valve.

The invention also provides a process for the reduction of NOx in diesel engine exhaust gases, comprising, in order, converting at least a portion of the NO in the gases to $NO_2$ by passing the gases over a catalyst, trapping at least the majority of carbonaceous particles in the gases on a trap and continuously oxidising said particles and cooling and recirculating at least a portion of the cleaned gases leaving the trap, to the engine cylinders, characterised in that the gases are cooled before passing over an exhaust gas recirculation valve.

BRIEF OF THE DESCRIPTION DRAWING

DETAILED DESCRIPTION OF THE INVENTION

Figure 1:
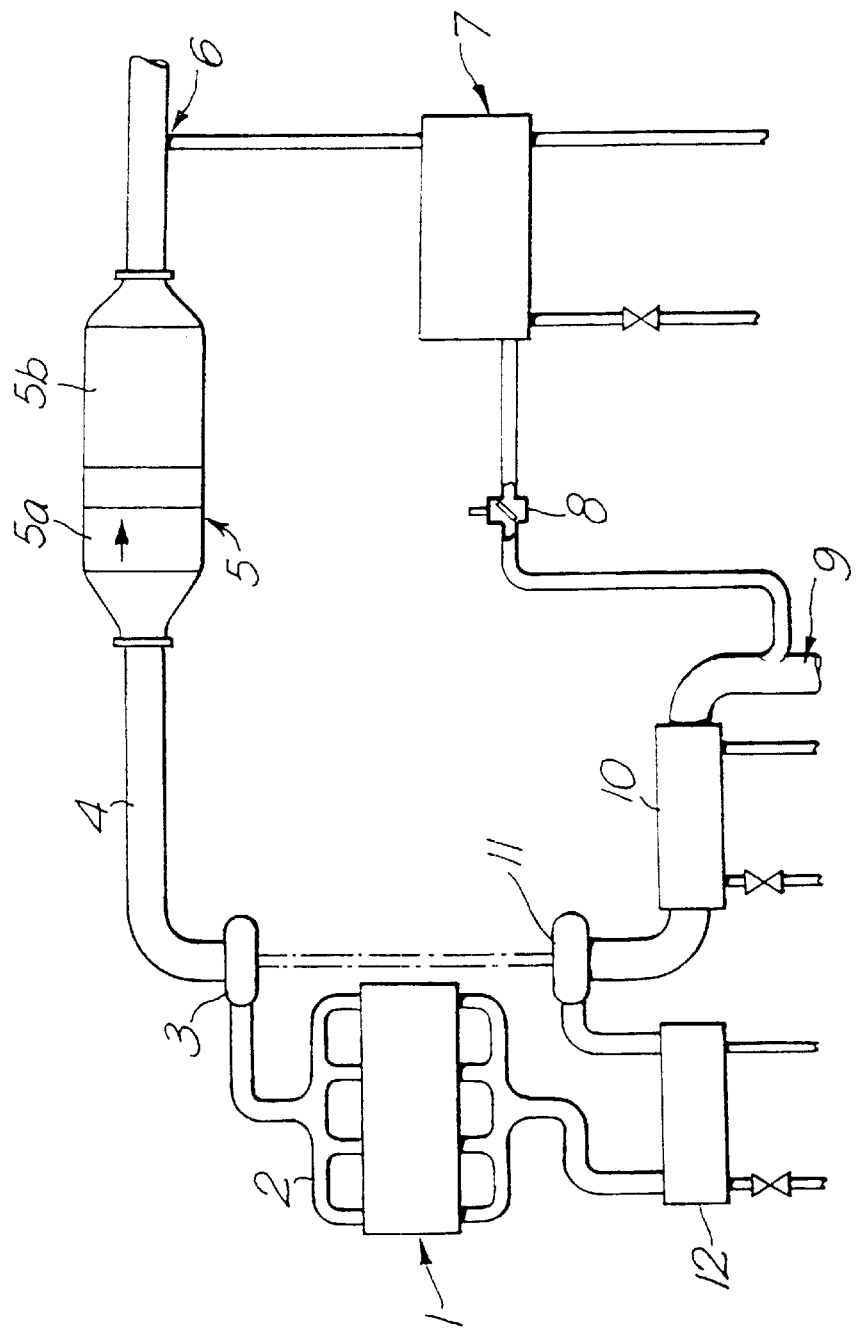
FIG. 1 shows a diesel engine incorporating an exhaust system of the present invention.

The exhaust gas recirculation may be carried out using essentially well established technology, using valves in the exhaust system and a control system. It is believed that the present invention may be operated most effectively at a lower recirculation ratio (eg 5 to 30% by vol) than is normal. Although engine intake vacuum may provide adequate EGR, it may be preferable to provide pumping to provide a vacuum using a variable speed fan or pump operating under the control of the engine management unit.

The catalyst and trap may be as described in U.S. Pat. No. 4,902,487 or as practised in the commercial Johnson Matthey CRT device. A preferred trap is an extruded ceramic, eg cordierite, wall flow filter.

It is to be realised that since only a portion of the exhaust gases is recycled, the system and process of the invention may be operated in one embodiment so that such a portion of the exhaust gases leaving the engine is treated by the catalyst and trap and all the treated portion is recirculated. Of course, in accordance with the invention, a cooler and an EGR valve are fitted in that order downstream of the trap. The remainder of the exhaust gases is passed into a conventional exhaust system which may desirably contain a separate catalyst and trap combination.

The present invention is believed to offer, in its preferred embodiments, certain unexpected advantages. The invention, because it does not depend upon a reduction catalyst reaching light-off temperature, is effective to reduce NOx at all engine operating temperatures. Additionally, traditional EGR systems suffer from wear and other degradation both of the EGR valves which are used to extract the recirculating portion of the exhaust gases, and on engine or exhaust components themselves. Such degradation may lead to expensive rebuilds, and a system that offers the potential for savings in this area has considerable economic value. In particular, the reduction in soot provides relatively clean gas for the cooling means. The main benefit of this is the maintenance of good heat exchange compared to a heavily sooted cooling means, but other consequences include reduced servicing requirements.

In accordance with the principles of the present invention, the skilled person may adapt the invention to different diesel engines and in different ways achieve the benefits of the invention.

The present invention is illustrated with reference to the accompanying schematic drawing of one embodiment of the invention.

A heavy duty diesel engine is generally indicated by 1. The engine exhaust manifold, 2, connects to a turbine, 3, and feeds into an exhaust system, 4. A standard commercial Continuous Regenerating Trap 5, obtainable from Johnson Matthey PLC, Royston, England, is fitted in the exhaust system, and includes a catalyst element, 5a, and a filter element, 5b. Mounted downstream of the CRT, is a simple T-junction pipe, 6, which can extract a portion of cleaned exhaust gas, according to the status of the exhaust flow valve described below. The portion of exhaust gas is passed to an exhaust gas cooler, generally indicated by 7, which is effective to reduce the temperature of the exhaust gas to the range 80 to 150° C. The exhaust gas cooler may be a liquid-cooled device, as shown in the drawing, or air cooled. The cooled gas then passes through an exhaust gas flow valve, 8, which is actuated under the control of an engine management unit (not shown). According to the position of the valve (in the particular test reported below, shut=no EGR, fully open=30% EGR), exhaust gas is extracted through pipe 6 for recirculation. The engine management unit utilises conventional sensing to determine suitable load conditions for EGR operation, for example at idle and up to about half load conditions, including acceleration, but the use of EGR under full load conditions is not presently expected to be advantageous.

The exhaust gas is then blended with fresh air for combustion taken through an air intake, 9. Desirably an inter-cooler unit, 10, cools the combustion air and recycled exhaust gas to about 25 to 40° C. before it is compressed by a turbocharger unit, 11, driven by a shaft from the turbine, 3. The charge of gas is then passed through the standard inter-cooler unit, 12, to cool the gas to about 35 to 60° C. before it is fed to the engine.

The invention will also be described for illustrative purposes only in the following Example.

EXAMPLE

A heavy duty 10 litre diesel bus engine (manufactured by Volvo) was used for a series of tests using the configuration shown in FIG. 1.

Figure 2:
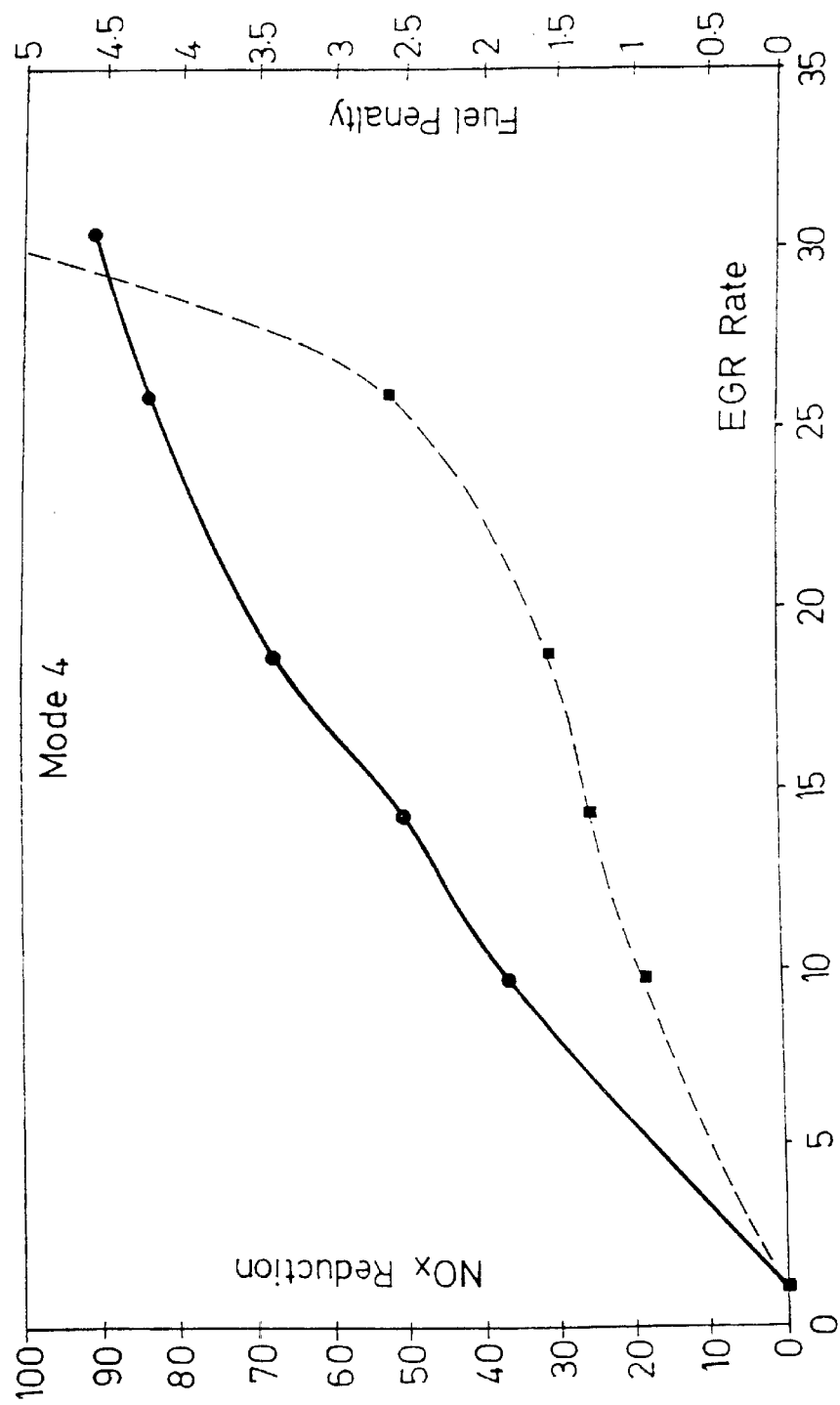
FIG. 2 shows NOx reduction in the system of the present invention.

The reduction of NOx at the tailpipe, relative to the normal output of the engine, was plotted on FIG. 2 at various EGR rates. (The prototype valve could not be closed entirely and even in the nominally fully closed position provided about 1% EGR. It can readily be seen that even at 5% EGR, there is an approximately 15% reduction in tailpipe NOx emissions. At EGR rates of 25 to 30%, the reduction of NOx is 80 to 90% or more. Use of EGR does, however, incur a fuel penalty shown in a broken line on FIG. 2. Beyond 30% EGR, this penalty becomes unacceptable.

The results shown in FIG. 2 represent 50% load (585 Nm) at an intermediate speed (1450 rpm), which is equivalent to ECE Regulation 49 mode #4.

Further tests were carried out under different load/engine speed combinations according to the various modes of ECE R-49. In all cases there was a considerable and unexpected reduction in NOx, increasing with EGR rate. The system tested was not optimised, yet promises NOx reductions of 70% or more. It is believed that a conventional EGR, operating at much higher EGR rates than in the present invention, eg 30 to 50%, does not offer NOx reductions greater than 60%.

What is claimed is:

1. A diesel engine system comprising a diesel engine including engine cylinders, an engine management unit and an exhaust system, said exhaust system incorporating a catalyst effective to convert NO to $NO_2$ under normal operating conditions, a carbonaceous particulate trap mounted downstream of the catalyst and adapted to oxidize particulates, an exhaust gas recirculation valve for recirculating a portion of the exhaust gases to said engine cylinders wherein said valve is controlled by said engine management unit and the exhaust gases have a volume, and means for cooling the recirculated exhaust gases wherein said means for cooling is mounted between said trap and said valve, wherein said valve is mounted completely downstream of said means for cooling such that the recirculated exhaust gases are cooled by said means for cooling to a temperature of about 80° C. to about 150° C. before the recirculated exhaust gases pass over said valve.

2. A system according to claim 1, wherein the exhaust gas recirculation valve is adjustable to recirculate between 5 to 30 percent by volume according to the position of the valve.

3. A system according to claim 1, wherein a pump is incorporated between the exhaust gas recirculation valve and the engine cylinders, wherein the pump is controlled by the engine management unit.

4. A system according to claim 1, wherein the diesel engine is a heavy duty diesel engine.

5. A system according to claim 1, wherein said trap is adapted to oxidize particulates by combusting the particulates with at least the $NO_2$ converted from the NO by said catalyst.

6. A process for controlling the amount of NOx in diesel engine tailpipe exhaust gases, the process comprising the steps of: converting at least a portion of NO in the engine exhaust gases to $NO_2$ by passing the engine exhaust gases over a catalyst; trapping at least a majority of carbonaceous particulates in the engine exhaust gases with a trap; continuously oxidizing the particulates; cooling the cleaned engine exhaust gases leaving the trap to a temperature of about 80° C. to about 150° C.; and recirculating at least a portion of the cooled exhaust gases to the engine cylinders using an exhaust gas recirculation valve.

7. A process according to claim 6, wherein the quantity of cleaned engine exhaust gases recirculated is in the range 5 to 30 percent by volume.

8. A process according to claim 6, wherein the step of oxidizing the particulates comprises combusting the particulates with at least the $NO_2$ converted from the NO by the catalyst.

* * * * *